(12) United States Patent
Sandler et al.

(10) Patent No.: US 11,570,095 B2
(45) Date of Patent: Jan. 31, 2023

(54) PLATFORM COMPRISING A PLURALITY OF ROUTING ENTITIES

(71) Applicant: DRIVENETS LTD., Raanana (IL)

(72) Inventors: Evgeny Sandler, Herzliya (IL); Amir Krayden, Even Yehuda (IL); Ido Susan, Sde Warburg (IL); Chen Goldenberg, Ramat Hasharon (IL)

(73) Assignee: DRIVENETS LTD., Raanana (IL)

( * ) Notice: Subject to any disclaimer, the term of this patent is extended or adjusted under 35 U.S.C. 154(b) by 6 days.

(21) Appl. No.: 16/628,159

(22) PCT Filed: Jul. 11, 2019

(86) PCT No.: PCT/IL2019/050786
§ 371 (c)(1),
(2) Date: Jan. 2, 2020

(87) PCT Pub. No.: WO2020/021528
PCT Pub. Date: Jan. 30, 2020

(65) Prior Publication Data
US 2020/0244575 A1    Jul. 30, 2020

Related U.S. Application Data

(60) Provisional application No. 62/703,459, filed on Jul. 26, 2018.

(51) Int. Cl.
*H04L 45/58* (2022.01)
*H04L 45/60* (2022.01)

(52) U.S. Cl.
CPC ............ *H04L 45/583* (2013.01); *H04L 45/60* (2013.01)

(58) Field of Classification Search
CPC combination set(s) only.
See application file for complete search history.

(56) References Cited

U.S. PATENT DOCUMENTS 8,953,439 B1 * 2/2015 Lin ..................... G06F 11/1438
370/219
9,832,099 B1 * 11/2017 Traina .................... H04L 45/02
(Continued)

FOREIGN PATENT DOCUMENTS

WO          2016123550 A1    8/2016

*Primary Examiner* — Peter P Chau
(74) *Attorney, Agent, or Firm* — Browdy and Neimark, PLLC (57) ABSTRACT

A physical network element is provided which is configured to operate as a plurality of separated routing entities, each functioning independently of the others, wherein the physical network element is characterized in that: a) each of the plurality of routing entities is provided with its own control, management and data planes, as well as with a dedicated routing information base table and a forwarding information base table; and b) all of the plurality of routing entities are configured to operate while sharing at least one member of a group that consists of: (i) one or more packet processors comprised in the physical network element; (ii) one or more central processing units (CPUs) comprised in the physical network element; (iii) one or more fabrics comprised in the physical network element; and (iv) one or more network interfaces comprised in the physical network element.

9 Claims, 5 Drawing Sheets

(56) References Cited

U.S. PATENT DOCUMENTS

| | | | |
|---|---|---|---|
| 2010/0046531 A1* | 2/2010 | Louati | H04L 45/586 |
| | | | 370/401 |
| 2011/0134931 A1* | 6/2011 | Merwe | H04L 41/0843 |
| | | | 370/401 |
| 2016/0294728 A1* | 10/2016 | Jain | G06F 9/5072 |
| 2018/0287966 A1* | 10/2018 | Kamath | G06F 9/45558 |

* cited by examiner

PLATFORM COMPRISING A PLURALITY OF ROUTING ENTITIES

TECHNICAL FIELD

The present disclosure relates generally to the field of networking, and in particular, to allocation of hardware resources to various routing applications.

Glossary

ACL—Access Control List.
BGP—Border Gateway Protocol.
CPU—central processing unit.
DRAM—Dynamic Random Access Memory.
FIB—forwarding information base table.
L3VPN—Layer 3 Virtual Private Network.
LIF—logical interface.
RIB—routing information base table.
SRAM—Static Random Access Memory.
TCAM—Ternary Content-addressable memory.
VRF—virtual routing and forwarding.

BACKGROUND

Today's network operators need to deploy a plurality of physical routing devices in their networks for various purposes. Moreover, in many cases, a number of routing devices may be deployed for different services even though they are all located at the same geographical proximity, while only a small percentage may be utilized out of these routing devices. Various reasons might lead to the occurrence of such a situation.

One such example is when a network operator is required to separate services to be carried out by different routing devices in order to avoid a situation whereby one service interruption affects the provisioning of another service. For example, if one router is running public internet services while another router is running residential business services, denial of service due to attack on the public internet router, must not affect the routing plane of the residential business services' router.

Another example may be when a network operator decides to separate services to different routers because each service refers to a different entity (e.g. a different subsidiary), and each router should therefore be managed by a different NoC (Network Operation Center) team. For example, let us assume that one router provides network services to customers of an organization, while another router is used by a local data center for servers' connectivity.

Another example may be when the network design requires carrying out two different routing functions. Let us consider a case where according to the network security design, traffic that is exchanged between two customers must be conveyed via at least two routing hops (e.g. MPLS PE router and MPLS P router).

Also, there are cases where operational considerations dictate that routers' maintenance windows must be carried out while meeting different constrains per different services.

The scenarios exemplified above lead to the deployment of multiple hardware routing devices that are utilized in a very inefficient way. Now, although it may seem that consolidation of multiple routers with a single hardware platform may solve this hardware utilization problem, yet, the routing segregation constrains as described in each of the above scenarios must be met and cannot be simply dismissed.

In IP-based networks, VRF (virtual routing and forwarding) technology is a technology that allows a plurality of instances of a routing table to co-exist within a single router at the same time. Because the routing instances are independent, the same or overlapping IP addresses may be used without conflicting with each other. In these cases, network paths can be segmented without requiring multiple routers.

VRF may be implemented in a network device by distinct routing tables known as FIBs (forwarding information bases), one FIB per routing instance. Alternatively, a network device may have the ability to configure different virtual routers, where each has its own FIB that is not accessible to any other virtual router instance located at the same device.

Unfortunately, VRF is not suited to provide an adequate solution to some critical problems. If we were to take for example a case where an intentional or an unintentional flooding of BGP (Border Gateway Protocol) packets is generated by the customer's network that is associated with a certain VRF (VRF-x), or any other applicable control plane protocol (used for routing/management), the routing plane of another customer using another VRF (VRF-y) will be affected as well. This drawback results from the fact that all routing processes are running on the same routing device. Another problem may be demonstrated when considering a case where two routing devices are running L3VPN (Layer 3 Virtual Private Network) services. These routing devices cannot be consolidated into a single routing device using VRFs, since the L3VPN service itself is implemented by means of VRFs. Consequently, such a consolidation might lead to two VRFs having the same ID that belong to different tenants, which co-exist at the same router.

The present invention solution seeks to provide an answer to these problems, allowing, for example, multiple tenant routers to run on the same physical routing platform, and the tenant routers may run with overlapping VRF IDs. Furthermore, according to the solution provided herein, routing planes and management planes of tenant routers are segregated and do not affect each other.

SUMMARY

The disclosure may be summarized by referring to the appended claims.

It is an object of the present disclosure to provide a physical network element, a system and a software that enable running of multiple routing entities at the same physical routing platform.

It is another object of the disclosure to provide a physical network element, a system and a software that enable using routing entities that are configured to operate within a network while having overlapping VRF IDs.

It is still another object of the disclosure to provide a physical network element, a system and a software having routing planes of routing entities that are segregated and do not adversely affect the operation of each other.

Other objects of the present disclosure will become apparent from the following description.

According to a first embodiment of the present disclosure, there is provided a physical network element configured to operate as a plurality of routing entities, each functioning independently of the others, wherein the physical network element is characterized in that: a) each of the plurality of routing entities is provided with its own control, management and data planes, and with a dedicated routing information base table and a forwarding information base table;

b) all of the plurality of routing entities are configured to operate while sharing at least one member of a group that consists of:

(i) one or more packet processors comprised in that physical network element;

(ii) one or more central processing units (CPUs) comprised in that physical network element;

(iii) one or more fabrics comprised in that physical network element; and (iv) one or more network interfaces comprised in that physical network element.

The term "routing entities" as used herein throughout the specification and claims is used to denote a networking entity that forwards data packets within/between computer/communication networks. Routing entities perform traffic directing functions of data packets along the Internet, from one routing entity to another, until the data packets reach their respective destinations.

The terms "physical network element" or "physical network node" as used herein throughout the specification and claims are used to denote any one member of a group of physical resources such as a packet processor, a CPU, memory means, network interfaces and the like, that can act as a single or multiple entities that may be used in providing support to carry out routing functionality (i.e. "routing entities").

In accordance with another embodiment, the physical network element further comprises a managing entity that is configured to interconnect the routing entities included in that physical network element (i.e. the routing platform) and to manage their operations.

According to another embodiment, the physical network element is further configured to enable software processes of each of the plurality of routing entities to run in a software container which is separated from software containers used to run software process associated with each of the other of the plurality of routing entities.

The term "software container" as used herein throughout the specification and claims, is used to denote a software packaged into standardized units for development, shipment and deployment. A container image is a lightweight, stand-alone, executable package of a piece of the software that includes anything required to run that piece of software, selected from among: code, runtime, system tools, system libraries, settings, etc.

By yet another embodiment, the routing entities are interconnected via the shared routing platform (e.g. by means of "demarcation LIFs", i.e. IP addresses with associated characteristics, such as a role, a home port, etc. used as demarcation points, with no need to physically interconnect their network interfaces). This interconnection may be implemented logically, by means of a "demarcation LIF" that imitates interconnection via network interfaces. Such an interconnection does not require any physical cabling therebetween.

In accordance with another embodiment, shared resources of the physical network element (e.g. TCAM entries, counters, shapers, meters, DRAM/SRAM etc.) are allocated for each of the routing entities according to at least one configurable resource template. Consequently, such a physical network element may operate as a multi-routing entities platform, allowing flexible resource management and therefore a better utilization of existing hardware. The resource template referred to hereinabove, defines dedicated resources per each routing entity.

By yet another embodiment, each of the plurality of routing entities maintains a dedicated forwarding plane on one or more of the shared packet processors and fabrics of the physical network element. For implementing this embodiment, the segregation of the forwarding plane may be carried out by a multi-routing entities hardware abstraction layer (referred to hereinafter as "HAL"). In other words, the multi-routing entities may maintain forwarding information base tables with an overlapped source and destination address per VRF with an overlapped ID for the same packet processor.

According to still another embodiment, each of the plurality of routing entities maintains at least one logical interface on the shared physical network interfaces of the shared packet processor. For implementing this embodiment, the segregation for the different routing elements may be done by different customer or service VLAN domains.

By yet another embodiment, each of the plurality of routing entities maintains a dedicated control plane at least one shared CPU and at least one shared packet processor. Optionally, control plane processes of different routing entities are segregated by means of software containers. In other words, each of the plurality of routing entities may maintain the same routing protocol as the others, carried out in a network that may overlap other networks of routing entities and IP addresses comprised in these other networks.

According to another embodiment, each of the plurality of routing entities maintains a dedicated management plane at one or more of the shared packet processors, one or more of the shared CPUs and at a shared platform managing entity. Management plane processes of different routing entities may be segregated by means of software containers, i.e. each routing entity may be reached independently by implementing a management protocol (e.g. a remote CLI) and configured independently of the other routing entities sharing the same physical network element (routing platform) described above.

The functionalities described above, when preformed by the physical network element that comprises a plurality of routing entities, are preferably segregated and are fully independent of other routing entities sharing the very same platform. Specifically, software malfunctions or misconfigurations on one of the routing entities, will not adversely affect the operation of another routing entity. Also, in case that a routing plane overload occurs (e.g. caused by massive network topology changes or by intentional denial of service attack on the routing entity) at one of the routing entities, it will not adversely affect any control plane of another routing entity sharing the same platform.

In accordance with still another embodiment of the present disclosure, the physical network element is further configured to enable dynamically (e.g. while the physical network element is operative) adding of one or more additional routing entities to the physical network element, by using a management application configured to manage the routing entities comprised in the physical network element, and wherein the dynamic addition of the one or more additional routing entities is carried out after the management application has confirmed that there are enough resources available to be shared on the routing platform by all the routing entities, including the one or more additional routing elements.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed physical network element may be implemented by using various methods that are known in the art per se. In addition, the described embodiments comprise different features, not all of which are required in all embodiments of the invention. The scope of the invention can be summarized by referring to the appended claims.

The present invention relates to a typical routing platform that is composed of one or more routing processors (for redundancy sake), forwarding devices (according to the number of the network interfaces that exist in that routing platform) and fabric devices.

The routing processors are compute elements configured to run control plane protocols (e.g. routing protocols) and management plane protocols referred to herein as routing engines. The routing protocols populate routing information base table (RIB), so that eventually, a RIB table includes routes to all reachable destinations in the network.

Forwarding devices are typically based on packet processors which may be data plane ASIC or FPGA. Packet processors have multiple network interfaces. Each network interface may be additionally segregated to multiple logical interfaces (LIFs). LIF may be represented at a network interface as VLAN, MPLS LSP, L3 tunnel, etc. The packet processors perform packet forwarding from one LIF to another. The forwarding decision is taken by a packet processor according to the respective forwarding information base table (FIB). A FIB table is populated with best routes to the destinations reachable by the router that are available at that RIB table. In addition to the FIB tables, packet processors maintain other resources such as Access Control List (ACL), counters, traffic meters, shapers and the like, and by using these resources a decision may be taken on how to forward the data packets received. In addition to a packet processor, a forwarding device includes a CPU that runs a Forwarding Engine application, wherein such a Forwarding Engine application is responsible to maintain FIB, ACL and other packet processor resources according to the routing engine directives. The Forwarding Engine application also reports the status of the forwarding device (such as network interfaces state, counters, etc.) to the routing engine and conveys routing protocol packets received by the packet processor, towards a routing engine.

The fabric devices are typically based on fabric elements which may be data plane ASIC or FPGA chips. Fabric elements are used for interconnecting forwarding devices in order to enable forwarding a packet from a LIF that resides on one forwarding device to another LIF that resides on another forwarding device. In addition to the fabric element, a fabric device typically includes a CPU that runs the Fabric Engine application. Fabric Engine application is responsible to report the status of the fabric element (such as fabric interfaces state, counters, etc.) to the routing engine.

The platform management entity A.K.A platform management network, interconnects all routing processors, forwarding devices and fabrics comprised in the routing platform (the physical network element). The platform management network forwards RIB-FIB synchronization flows, routing protocols packets flows between data plane and control plane (A.K.A the slow path), as well as managing the platform performance and maintains packets' flows.

Figure 1:
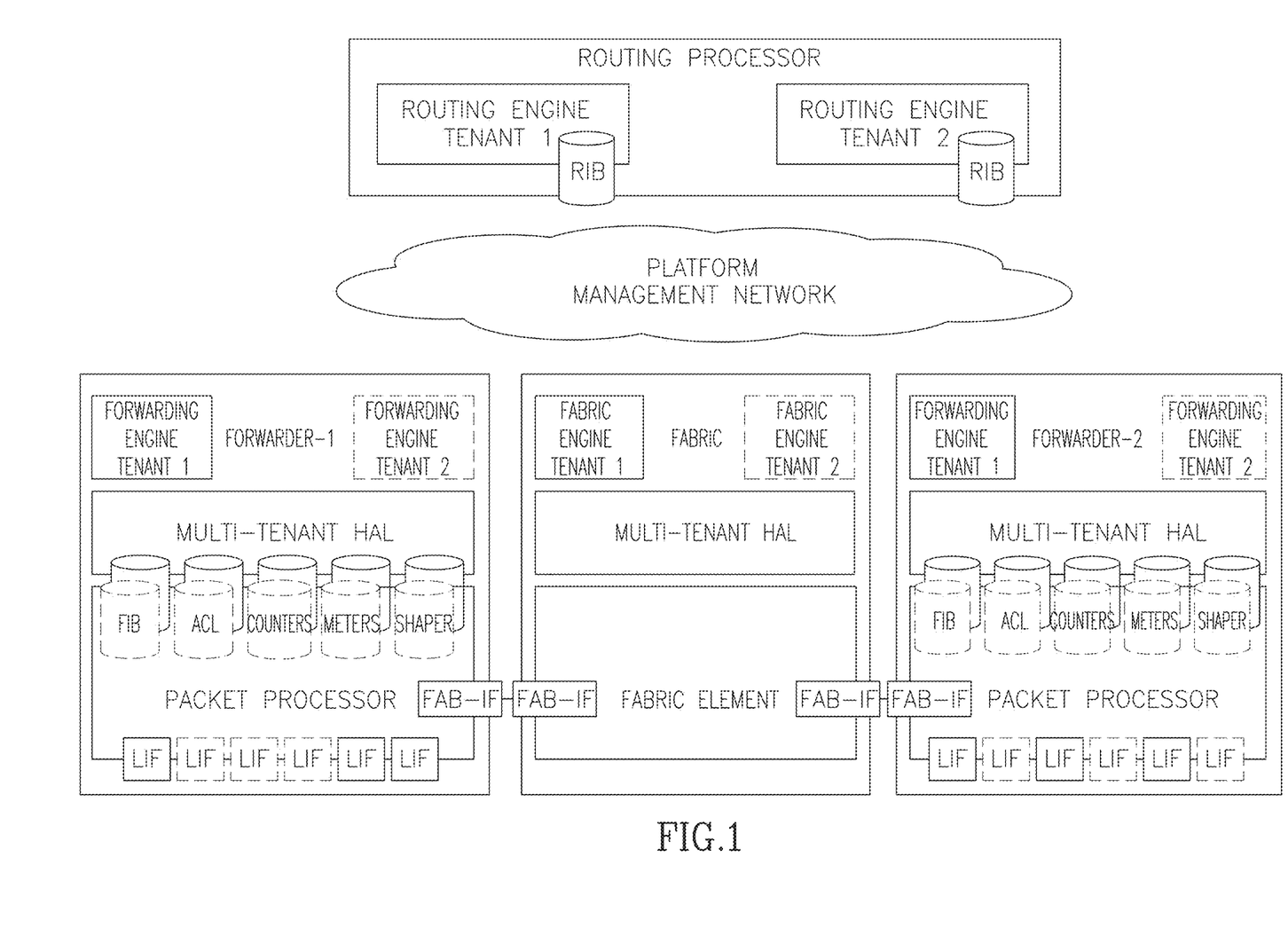
FIG. 1. illustrates a hardware routing platform (i.e. a physical network element) comprising two routing entities.

FIG. 1. illustrates an example of an embodiment construed in accordance with the present invention of a physical network element that comprises a plurality of routing entities, which is also referred to herein as a multi-tenant routing platform. The routing processor is configured to run multiple routing engines (a routing engine per each tenant (routing entity)). Each routing engine in this example maintains its own routing protocols and its own RIB table and is configured to execute the respective software in a separate software container. Dedicated computing, storage and network resources are allocated per each tenant routing engine container associated with a respective routing processor. Forwarding devices in the routing platform run multiple forwarding engines (preferably a forwarding engine per each tenant). Multi-tenant hardware abstraction layer (HAL) on a forwarding device allows sharing the packet processor resources (e.g. FIB, ACL, Counters, LIFs etc.) per each tenant forwarding engine. The fabric device in the routing platform runs multiple fabric engines (preferably a fabric engine per each tenant). The multi-tenant hardware abstraction layer (HAL) provides relevant fabric status reports to appropriate tenant fabric engine. For example, if a specific tenant router includes only a subset of the forwarding devices of the routing platform, then the fabric engine of this tenant will be notified only on the status of the appropriate fabric interfaces.

Figure 2:
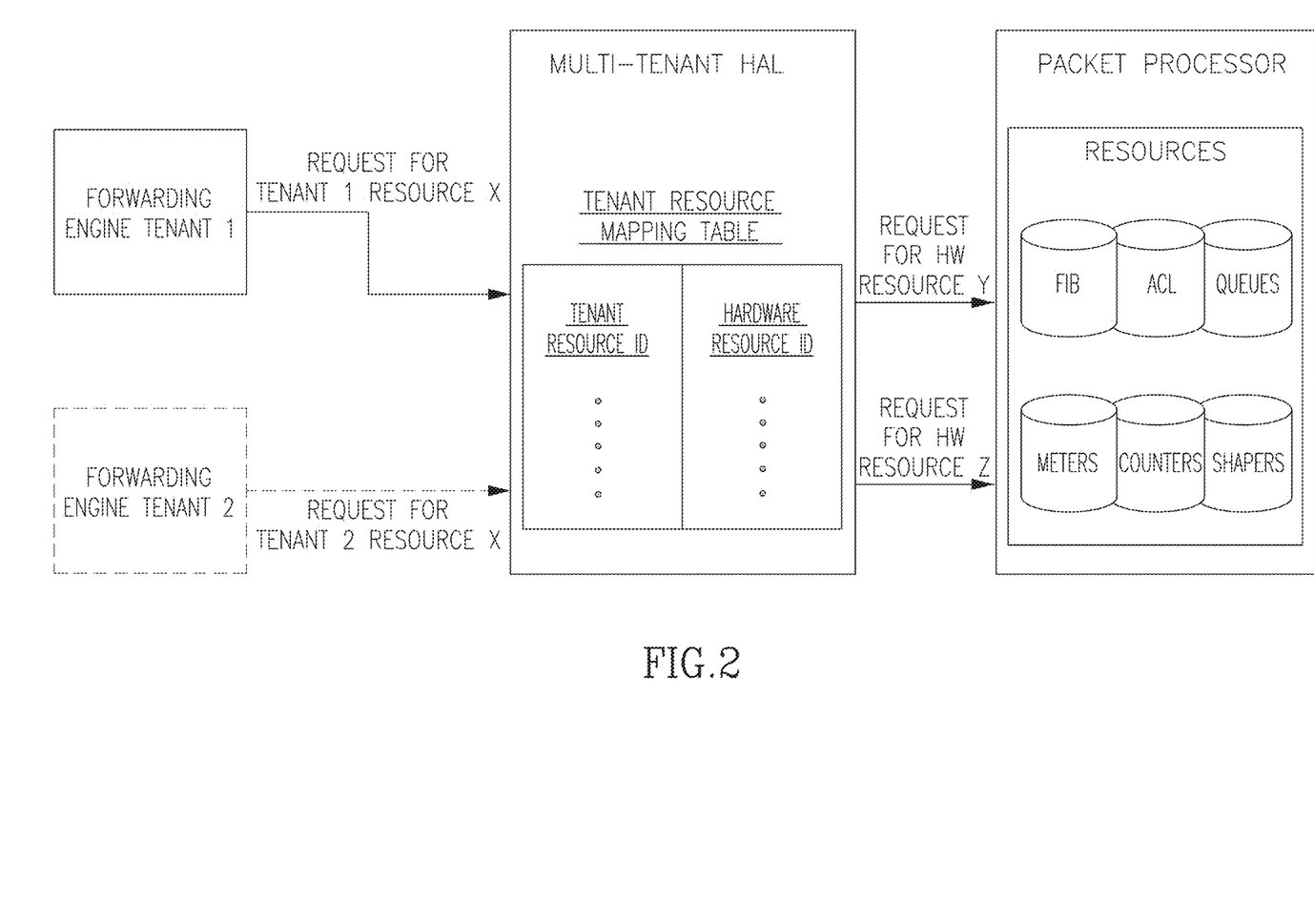
FIG. 2. demonstrates allocation of shared resources by multi-routing entities hardware abstraction layer ("HAL") per each forwarding device of a routing entity.

FIG. 2. demonstrates a mechanism that supports sharing of data-plane HW resources among different tenants (routing entities). Each routing entity is represented by a respective Forwarding Engine, and each Fabric Engine of a routing entity is configured to request specific HW resources (e.g. status of a queue or status of a VRF). The IDs of the resources may overlap for two different tenants sharing the same packet processor. The multi-tenant HAL maintains mapping table for mapping the IDs of the resources associated with the routing entity to the respective HW resource IDs. The HW resources' IDs are unique per packet processor (or any other shared entity).

Figure 3:
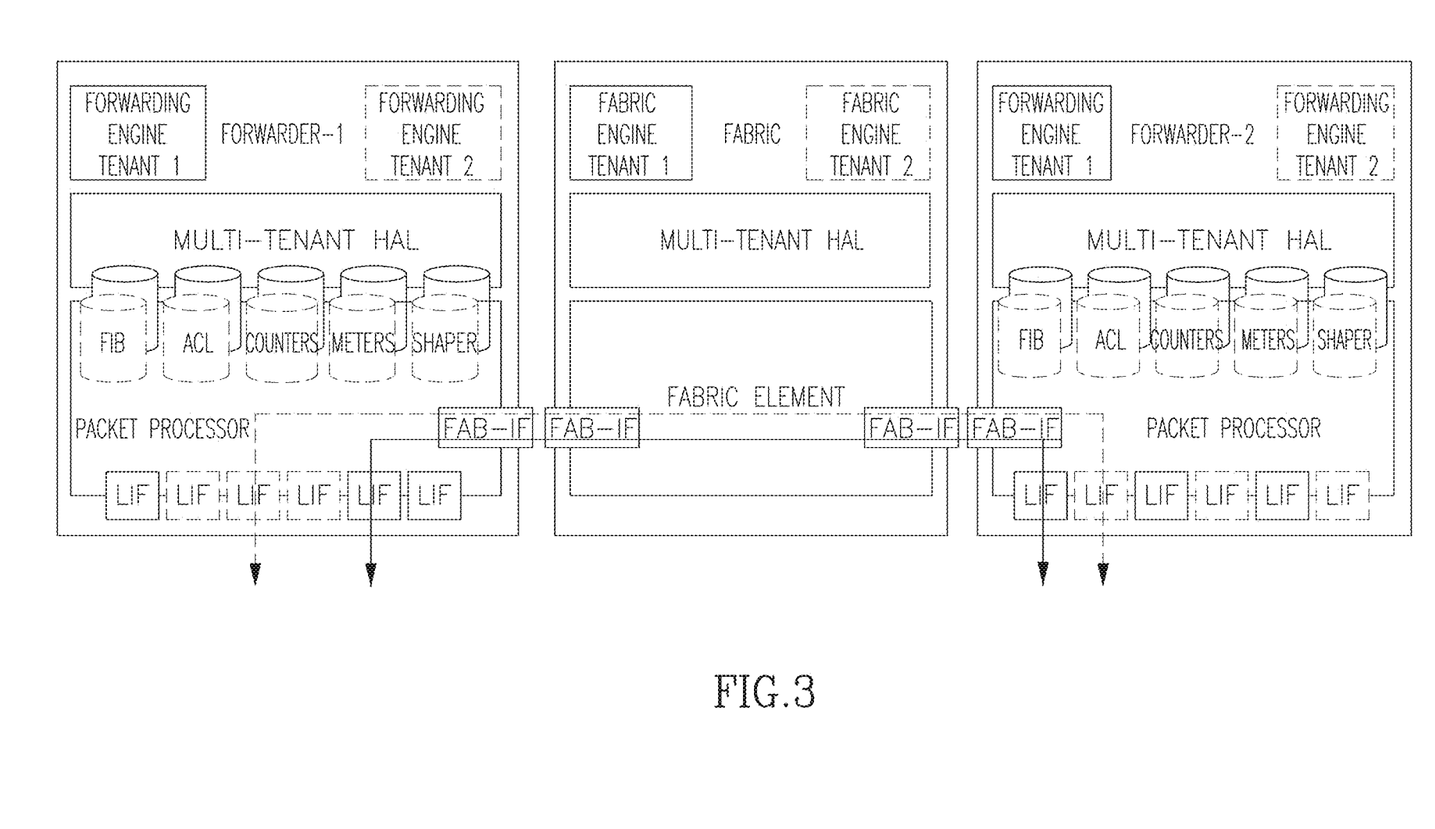
FIG. 3. illustrates data plane paths of two routing elements sharing the same hardware routing platform.

FIG. 3. describes data path per each tenant router within a multi-tenant routing platform. A received packet is associated with a tenant router according to its ingress LIF and is forwarded and handled according to the appropriate routing entity FIB, ACL, meters and shapers. The fabric is shared among multiple tenant routers, and consequently, the packet processor on forwarding device-1 (i.e. forwarder-1) may forward the packet from a specific tenant-1's LIF on forwarder-1 to specific tenant-1's LIF on forwarder-2. The detailed FIB lookups as well as the forwarding decisions of forwarder-1 and forwarder-2 in such a flow, are out of the scope of the present disclosure.

Figure 4:
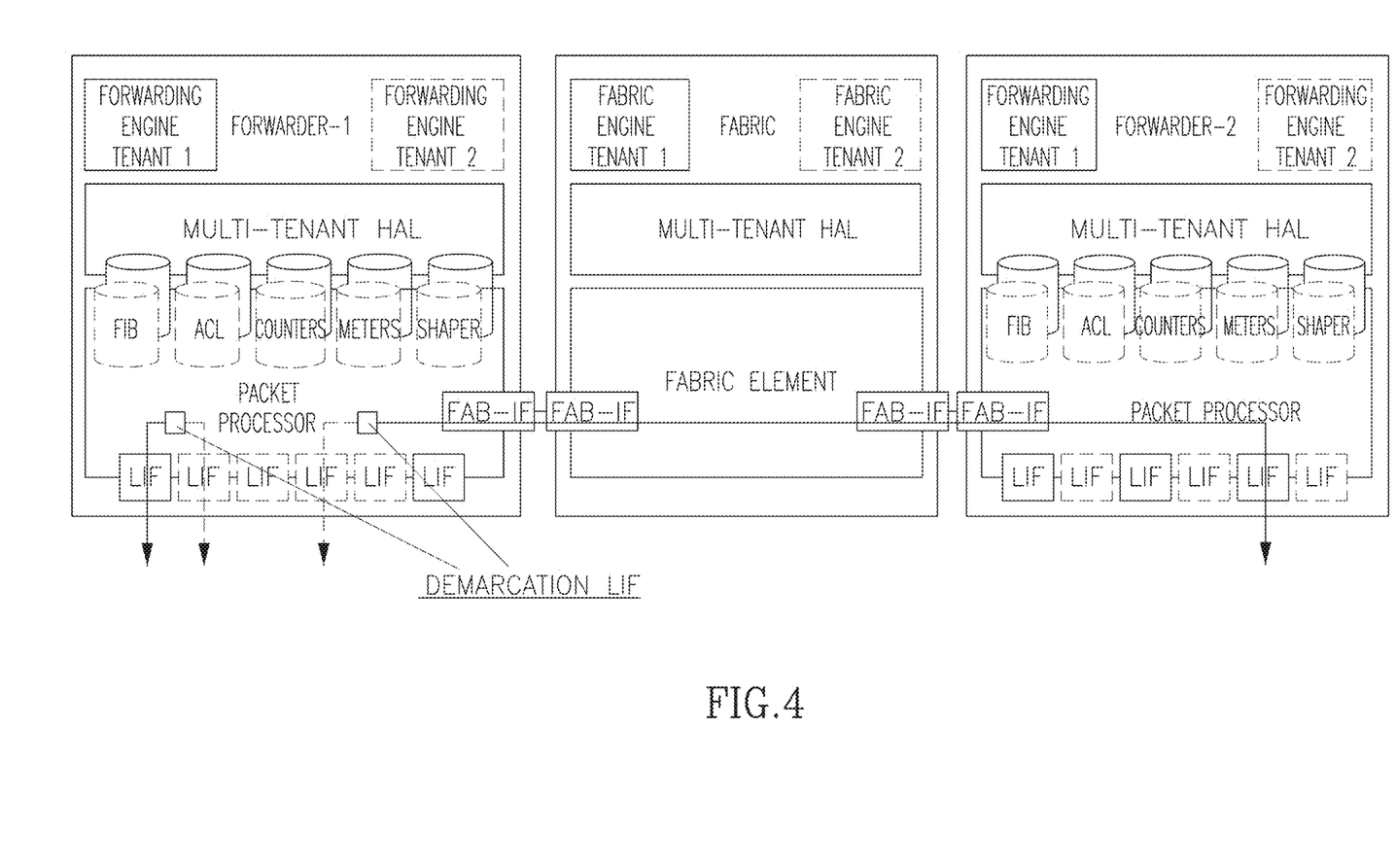
FIG. 4. illustrates a data plane interconnection between two touting entities sharing the same hardware routing platform by means of "demarcation LIF"

FIG. 4. illustrates a data path extending between two tenant routers interconnected logically via the shared routing platform, without physically connecting their network interfaces. A special "demarcation LIF" indicates for a packet processor that the packet is being conveyed by a tenant router and shall be forwarded according to the FIB of another tenant router. A "demarcation LIF" is not related to any physical network interface but is referred to as a logical instance that allows switching between tenant routers. A "demarcation LIF" indicates the destination router tenant for the packet. The received packet is associated with a tenant router according to the ingress LIF. The packet is forwarded and handled by the packet processor according to the appropriate tenant router's FIB, ACL, meters, shapers, etc. If the destination of a packet according to the tenant FIB is the demarcation LIF, the packet processor will perform an additional lookup in the FIB of the destination tenant router. The packet will then be forwarded to the LIF according to the FIB of the destination tenant router.

Figure 5:
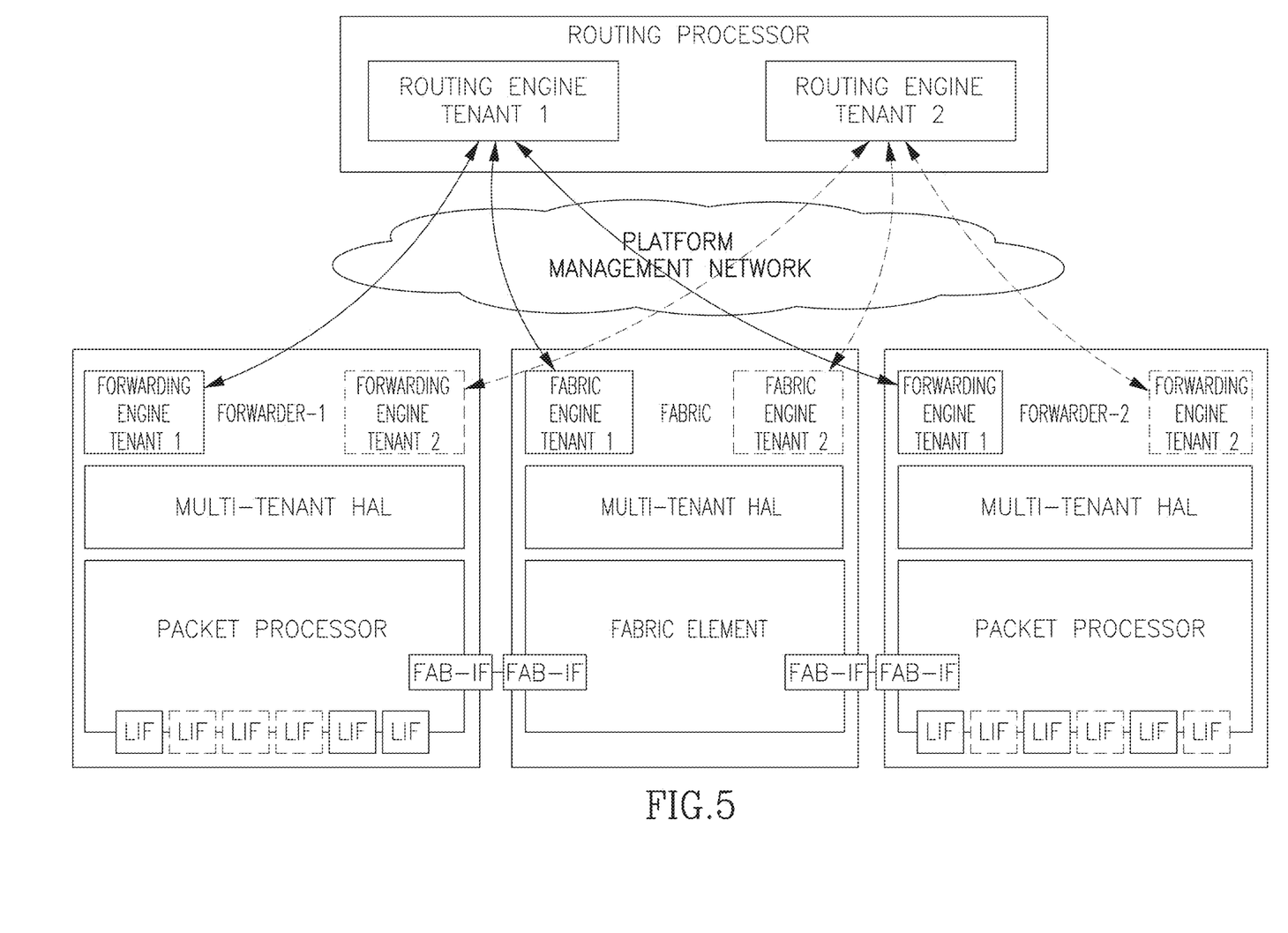
FIG. 5. demonstrates segregated control plane and management plane paths of two routing entities sharing the same hardware routing platform.

FIG. 5. demonstrates segregated control and management plane paths of two tenant routers sharing the same routing platform. The segregation is achieved by allocating both dedicated resources for each of the two tenant routers and forwarding engines, and by allocating dedicated resources for each tenant in the platform management network. The former is achieved by allocation of CPU cores and dedicated memory and managed sharing of the communication bus extending between the packet processor and the CPU on the forwarder device. The latter is achieved by carrying out network segregation by means of rate limited tunnels extending between routing engines and forwarding engines per each tenant router.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-tenant routing platform configured to operate in a communication network and the multi-tenant routing platform comprising a plurality of segregated tenant routers, each segregated tenant router functioning independently of the others, wherein the multi-tenant routing platform is characterized in that:
   a) each of the plurality of segregated tenant routers is provided with its own control, management and data planes, and with a dedicated routing information base table and a forwarding information base table; and
   b) all of said plurality of segregated tenant routers are configured to operate while sharing at least one member of a group that consists of:
      (i) one or more packet processors comprised in said multi-tenant routing platform;
      (ii) one or more central processing units (CPUs) comprised in said multi-tenant routing platform;
      (iii) one or more fabrics comprised in said multi-tenant routing platform; and
      (iv) one or more network interfaces comprised in said multi-tenant routing platform,
      and wherein each segregated tenant routers is configured to request specific HW resources, and IDs of said requested HW resources overlap for at least two different segregated tenant routers sharing a packet processor,
      and wherein said multi-tenant routing platform is configured to maintain a mapping table for mapping IDs of said HW resources with respective tenant routers from among said plurality of segregated tenant routers.

2. The multi-tenant routing platform of claim 1, further comprising a management network that is configured to interconnect the plurality of segregated tenant routers comprised in that multi-tenant routing platform and to manage their operations.

3. The multi-tenant routing platform of claim 2, further configured to enable software processes of each of the plurality of segregated tenant routers to run in a software container which is separated from software containers used to run software process associated with each of the other of the plurality of segregated tenant routers.

4. The multi-tenant routing platform of claim 2, wherein shared resources of the multi-tenant routing platform are allocated for each of the plurality of segregated tenant routers according to at least one configurable resource template.

5. The multi-tenant routing platform of claim 2, wherein each of the plurality of segregated tenant routers maintains a dedicated forwarding plane at one or more of the one or more shared packet processors and fabrics of the multi-tenant routing platform.

6. The multi-tenant routing platform of claim 2, wherein each of the plurality of segregated tenant routers maintains at least one logical interface at the shared physical network interfaces of the shared packet processor.

7. The multi-tenant routing platform of claim 2, wherein each of the plurality of segregated tenant routers maintains a dedicated control plane at one shared CPU and at least one shared packet processor.

8. The multi-tenant routing platform of claim 2, wherein each of the plurality of segregated tenant routers maintains a dedicated management plane at the one or more of the shared packet processors, one or more of the one or more shared CPUs and at a shared platform managing entity.

9. The multi-tenant routing platform of claim 2, configured to enable dynamically adding of one or more additional segregated tenant routers to the multi-tenant routing platform by using a management application configured to manage the plurality of segregated tenant routers comprised in said multi-tenant routing platform, and wherein said dynamic addition of the one or more additional segregated tenant routers is carried out after said management application has confirmed that there are enough resources available to be shared on the multi-tenant routing platform by all tenant routers of the multi-tenant routing platform, including the one or more additional segregated tenant routers.

* * * * *